United States Patent
Birecki et al.

(10) Patent No.: US 10,538,032 B2
(45) Date of Patent: Jan. 21, 2020

(54) THERMALLY DECOMPOSING MATERIAL FOR THREE-DIMENSIONAL PRINTING

(71) Applicant: Hewlett-Packard Development Company, L.P., Houston, TX (US)

(72) Inventors: Henryk Birecki, Palo Alto, CA (US); Krzysztof Nauka, Palo Alto, CA (US); Sivapackia Ganapathiappan, Los Altos, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 312 days.

(21) Appl. No.: 15/523,522

(22) PCT Filed: Nov. 3, 2014

(86) PCT No.: PCT/US2014/063674
§ 371 (c)(1),
(2) Date: May 1, 2017

(87) PCT Pub. No.: WO2016/072966
PCT Pub. Date: May 12, 2016

(65) Prior Publication Data
US 2017/0312983 A1 Nov. 2, 2017

(51) Int. Cl.
*B29C 64/165* (2017.01)
*B33Y 10/00* (2015.01)
*B33Y 30/00* (2015.01)
*B29K 77/00* (2006.01)
*B29K 105/00* (2006.01)
*B29C 64/112* (2017.01)
*B29C 64/393* (2017.01)
*B29C 64/291* (2017.01)
*B33Y 50/02* (2015.01)

(52) U.S. Cl.
CPC .......... *B29C 64/165* (2017.08); *B29C 64/112* (2017.08); *B29C 64/291* (2017.08);
(Continued)

(58) Field of Classification Search
CPC ........................... B29C 64/165; B29C 64/112
(Continued)

(56) References Cited

U.S. PATENT DOCUMENTS 3,574,888 A * 4/1971 Holaday ............... B29C 44/388
                                              141/170
5,006,364 A   4/1991 Fan
(Continued)

OTHER PUBLICATIONS

Cyanine 7, Genelink, http://www.genelink.com/newsite/products/mod_detail.asp?modid=60 (Year: 2019).*

*Primary Examiner* — Robert C Dye
*Assistant Examiner* — Russell E Sparks
(74) *Attorney, Agent, or Firm* — HPI Patent Department

(57) ABSTRACT

Provided in one example herein is a three-dimensional ("3D") printing method, comprising: (A) forming a layer comprising particles comprising a thermoplastic; (B) disposing over at least a portion of the layer a coalescent agent, which is radiation-absorbing and has a thermal decomposition temperature lower than or equal a melting temperature of the thermoplastic; (C) forming an object slice of a 3D object by exposing the coalescent agent to a radiant energy such that at least some of the coalescent agent thermally decomposes while causing at least some of the particles to fuse, wherein the object slice comprises the fused particles, and wherein the thermally decomposed coalescent agent is not radiation-absorbing; and (D) repeating (A) to (C) to form the 3D object comprising multiple object slices bound depth-wise to one another.

14 Claims, 7 Drawing Sheets

(52) U.S. Cl.
CPC ........ *B29C 64/393* (2017.08); *B29K 2077/00* (2013.01); *B29K 2105/251* (2013.01); *B33Y 10/00* (2014.12); *B33Y 30/00* (2014.12); *B33Y 50/02* (2014.12)

(58) Field of Classification Search
USPC ........................................................ 264/460
See application file for complete search history.

(56) References Cited

U.S. PATENT DOCUMENTS

| | | | |
|---|---|---|---|
| 6,823,928 B2 * | 11/2004 | Sercombe | B22F 3/26 164/97 |
| 7,104,773 B2 | 9/2006 | Maekawa et al. | |
| 7,316,904 B1 * | 1/2008 | Farkas | G01N 21/6428 435/40.5 |
| 8,287,112 B2 | 10/2012 | Van et al. | |
| 8,664,289 B2 | 3/2014 | Maeda et al. | |
| 9,023,566 B2 * | 5/2015 | Martin | G03G 9/08791 430/108.22 |
| 2005/0081991 A1 * | 4/2005 | Hatase | B28B 1/001 419/1 |
| 2007/0183918 A1 | 8/2007 | Monsheimer et al. | |
| 2010/0035502 A1 * | 2/2010 | Ruzek | D04H 3/11 442/401 |
| 2012/0231175 A1 | 9/2012 | Tan | |
| 2012/0282448 A1 | 11/2012 | Chretien et al. | |
| 2013/0078013 A1 | 3/2013 | Chillscyzn et al. | |
| 2013/0083276 A1 | 4/2013 | Iwahashi et al. | |
| 2014/0121327 A1 | 5/2014 | Schmidt et al. | |

* cited by examiner

THERMALLY DECOMPOSING MATERIAL FOR THREE-DIMENSIONAL PRINTING

BACKGROUND

Methods of fabricating three-dimensional ("3D") polymeric parts may include light area printing ("LAP"), selective laser sintering ("SLS"), inkjet binder sintering, fused deposition modeling ("FDM"), stereolithography ("SLA"), and digital light projection ("DLP") sintering. In general, for desirable printed object accuracy the heated area is determined by the coalescent agent disposed over a pulverulent layer of particles. In many instances of a layer-by-layer process, during the formation of the topmost layer, the coalescent agent within the already printed (and fused) layer(s) underneath may absorb energy again, thereby causing heating in both the topmost layer and the previously fused layer(s) underneath, as shown in FIG. 1. This may cause non-uniform temperature distribution, leading to excessive powder fusing in the regions outside the printed object contour, and thermal stresses, causing object deformation. This problem may be exacerbated when previously printed area protrudes outside of object section currently being formed/fused, as shown in FIG. 2. In this case, undesirable heating may adversely enlarge the fusing area in the top layer, and the fusing area become object shape dependent and difficult to compensate for. In addition, unintentional absorption of the radiant energy by underlying layers may cause non-uniform temperature distribution over the base pulverulent layer(s).

BRIEF DESCRIPTION OF THE DRAWINGS

The drawings are provided to illustrate various examples of the subject matter described herein related to a composition for 3D printing, particularly a thermally decomposing material for 3D printing, and are not intended to limit the scope of the subject matter. The drawings are not necessarily to scale.

DETAILED DESCRIPTION

Figure 1:
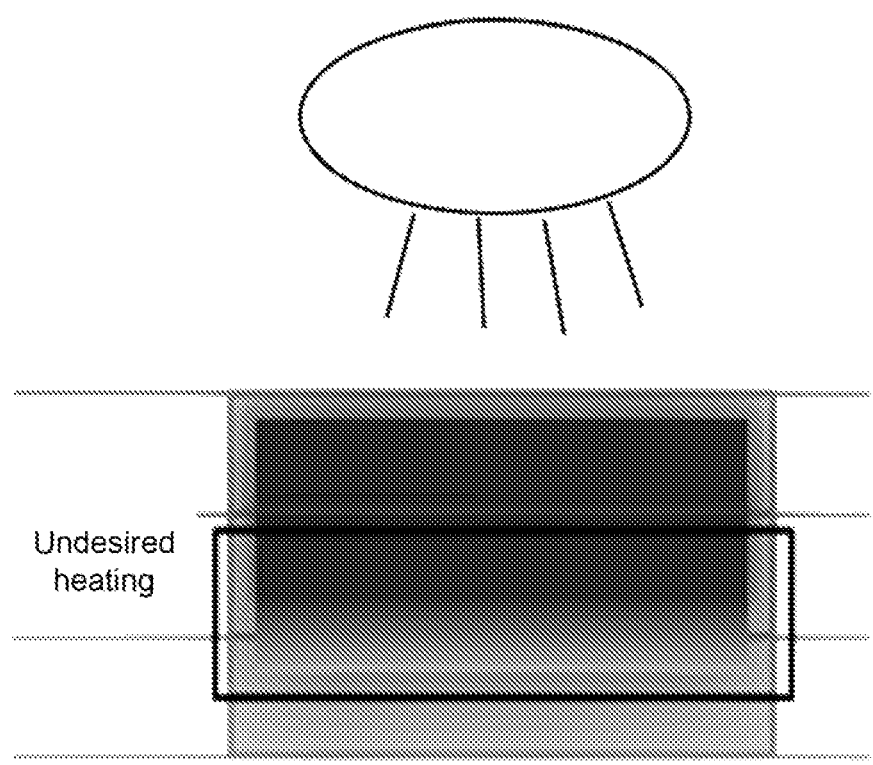
FIG. 1 provides a schematic showing, in one example, undesired heating of underlying layers.

Following below are more detailed descriptions of various examples related to thermally-decomposing material for three-dimensional ("3D") printing. The various examples described herein may be implemented in any of numerous ways.

Provided in one aspect of the examples is a three-dimensional ("3D") printing method, comprising: (A) forming a layer comprising particles comprising a thermoplastic; (B) disposing over at least a portion of the layer a coalescent agent, which is radiation-absorbing and has a thermal decomposition temperature lower than or equal to a melting temperature of the thermoplastic; (C) forming an object slice of a 3D object by exposing the coalescent agent to a radiant energy such that at least some of the coalescent agent thermally decomposes while causing at least some of the particles to fuse, wherein the object slice comprises the fused particles, and wherein the thermally decomposed coalescent agent is not radiation-absorbing; and (D) repeating (A) to (C) to form the 3D object comprising multiple object slices bound depth-wise to one another.

Provided in another aspect of the examples is a three-dimensional ("30") printing method, comprising: (A) forming a first layer comprising first particles comprising a first thermoplastic; (B) disposing over at least a portion of the first layer a first coalescent agent, which is radiation-absorbing and has a first thermal decomposition temperature between about 10° C. and about 25° C. lower than or equal to a melting temperature of the first thermoplastic; (C) exposing the first coalescent agent to a radiant energy, such that at least some of the first coalescent agent thermally decomposes while causing at least some of the first particles to melt, to sinter, or both, and the first coalescent agent to infiltrate the first layer; (D) solidifying the melted first particles to form a first object slice of a three-dimensional object, wherein the first object slice comprises the fused first particles, and wherein the thermally decomposed first coalescent agent is not radiation-absorbing; (E) disposing over at least a portion of the first object slice a second layer comprising second particles comprising a second thermoplastic; (F) disposing over at least a portion of the layer a second coalescent agent, which is radiation-absorbing and has a second thermal decomposition temperature between about 10° C. and about 25° C. lower than or equal to a melting temperature of the second thermoplastic; (G) exposing the second coalescent agent to a radiant energy, such that at least some of the second coalescent agent thermally decomposes while causing at least some of the second particles to melt, to sinter, or both, and the second coalescent agent to infiltrate the second layer, wherein the non-melted or non-sintered first particles in the first layer are not melted or sintered during the exposure; and (H) solidifying the melted second particles to form a second object slice of the three-dimensional object, wherein the second object slice comprises the second fused particles, and wherein the tide second thermally decomposed coalescent agent is not radiation-absorbing.

Provided in another aspect of the examples is a three-dimensional ("3D") printing system, comprising: a first device to form a layer; a second device to dispose a coalescence agent; an energy source to apply a radiant energy; and a controller to execute the instructions to: cause the first device to form a layer comprising particles comprising a thermoplastic; cause the second device to dispose over at least a portion of the layer a coalescent agent, which is radiation-absorbing and has a thermal decomposition temperature lower than or equal to a melting temperature of the thermoplastic; and cause the energy source to apply the radiant energy to the coalescent agent to form an object slice of a three-dimensional object, such that at least some of the coalescent agent thermally decomposes while causing at least some of the particles to fuse, wherein the object slice comprises the fused particles, and wherein the thermally decomposed coalescent agent is not radiation-absorbing.

Polymeric Particles

The particles comprising the polymer in the aforementioned layer described herein may comprise any suitable material. These polymeric particles (or "particles" for short herein) may comprise particles of various sizes or size distributions. In one example, these polymeric particles comprise mono-dispersed particles of the same size. The term "size" herein may refer to length, width, height, diameter, etc. Also, when referring to a plurality of objects, the value of any of the dimensions described herein may refer to a statistical average. The term "mono-dispersed" may refer to above at least 80% of the particles having the same size—e.g., at least about 85%, about 90%, about 95%, about 99%, about 99.5%, or higher. These particles may have the same chemical composition, or they may have multiple types of chemical compositions. In one example, the polymeric particles have different sizes so as to increase packing density.

The particles may comprise any suitable polymeric material. For example, the particles may comprise a thermoplastic. Examples of suitable polymers for the particles include polyamide, polystyrene, polyethylene, polyacetal, polypropylene, polycarbonate, polyurethane, and blends of any two or more of the aforementioned and/or other polymers. In one example, the weight-average molecular weight of the polymer employed in the particles may range from about 25,000 to about 350,000. Other molecular weight values are also possible, depending on the polymer involved. In one example, the polymer comprises a polyamide having a weight-average molecular weight ranging from about 70,000 to about 300,000. The polymer may comprise, or be, a nylon, such as a high molecular weight nylon e.g., polyamide 12, polyamide 6, polyamide 8, polyamide 11, polyamide 66, and combinations thereof. For any of the polymers used in the polymeric particle composition, the polydispersity (i.e., the ratio of weight-average molecular weight to number-average molecular weight) may range from 1 to 4.

The particles may have a core-shell configuration. A core-shell polymer may include an internal polymer particle (i.e., the core) that has a coating or layer (i.e., the shell) disposed thereon. The core and shell of a single particle may comprise different polymers (which have similar or different molecular weights), or may comprise the same type of polymer with different molecular weights. In one example, the core comprises a polymer having a high weight-average molecular weight ranging from about 70,000 to about 300,000, and the shell comprises a polymer having a low weight-average molecular weight ranging from about 25,000 to less than about 70,000. Examples of suitable core polymers include nylons, such as high molecular weight nylons e.g., polyamide 12, polyamide 6, polyamide 8, polyamide 11, polyamide 66, and combinations thereof. Examples of suitable shell polymer include low molecular weight nylons such as polyamide 12. When polyamide 12 is selected for both the core and the shell, it is to be understood that the weight-average molecular weight of the core ranges from about 70,000 to about 300,000, and the weight-average molecular weight of the shell ranges from about 25,000 to less than about 100,000. In another example, any of the low weight-average molecular weight polymers is selected as the core, and any of the high weight-average molecular weight polymers is selected as the shell. Examples of core-shell particles with different polymer type cores and shells include a shell of polyamide, and a core selected from polyether ketones, polycarbonates, acrylonitrile butadiene styrene (ABS) polymers, polyurethanes, and acrylic polymers.

The polymeric particles may have any suitable geometry, including size and shape. For example, the particles may be spherical, ellipsoidal, cubical, cylindrical, spiny, wire-like, sheet-like, flake-like, etc. The polymeric particles may have an irregular geometry. In one example, the polymeric particles described herein are spherical. The term 'spherical' herein may encompass a shape that is a perfect sphere or almost spherical. The term "almost spherical" may refer to a shape that resembles a sphere but is not completely spherical, such as having a relatively small amount of irregularity deviating from a perfect spherical shape. Thus, a spherical particle herein may refer to a particle having a sphericity of at least about 0.80—e.g., at least about 0.85, about 0.90, about 0.95, or higher.

The particles in the pulverulent layer may have any suitable size. For example, the particles may have an average diameter in the micrometer range. For example, the particles may have an average diameter of at least about 1 $\mu m$ e.g., at least about 5 $\mu m$, about 10 $\mu m$, about 50 $\mu m$, about 100 $\mu m$, about 150 $\mu m$, about 200 $\mu m$, about 250 $\mu m$, about 300 $\mu m$, about 400 $\mu m$, about 500 $\mu m$, or larger. In one example, the particles have an average diameter of between about 1 $\mu m$ and about 500 $\mu m$, between about 2 $\mu m$ and about 400 $\mu m$, between about 5 $\mu m$ and about 250 $\mu m$, between about 10 $\mu m$ and about 280 $\mu m$, between about 20 $\mu m$ and about 100 $\mu m$, etc. As described above, the particles may be mono-dispersed (with respect to size) and/or have the same chemical composition, or the particles may have multiple sizes (and/or size distributions) and/or chemical compositions. In one example, the particles have sizes and have the same chemical composition.

The particles may be physically modified, so that the surface topography of the particles is altered. Physical modifications may be accomplished using a milling process, a precipitation process, and/or a spraying deposition process. In one example, the surface topography of the particles is modified so that nodules are present at the respective surfaces of the particles after the modification process is complete. Nodules are small protrusions/features that extend outward from the surface of a particle. Each nodule may have a diameter or an average diameter ranging from about 50 nm to about 5 $\mu m$. Not to be bound by any particular theory, but nodules present at the surfaces of the particles may increase the contact surface area of the particles with neighboring particles in the layer (disposed over a substrate) comprising the polymeric particles. As a result, the nodules may increase the efficiency of any sintering, fusing, curing process that is subsequently performed involving the particles.

The particles may be chemically modified, such as at the surface thereof. Chemical surface modifications may be performed to improve the wetting of the polymeric particles with subsequently deposited materials (i.e., to facilitate improved fluid interaction), and/or to enhance cross-linking between the particles during curing (e.g., sintering, melting, fusing, etc.), thereby enhancing the mechanical strength and elongation performance of the resultant 3D object.

The wetting angle of the polymeric particles may be modified to be less than 45°. This wetting angle may increase the ability of the subsequently deposited material(s) to penetrate and infiltrate into the layer comprising the polymeric particles. A wetting angle of less than 45° may be achieved by introducing chemical building blocks, such as hydroxyl groups, onto the surface of the particles. In one example, a hydroxyl group is introduced onto the surface of the particles by treating the particles with a hydroxyl-containing compound, such as glycerol, pentanediol, hexanediol, and pentaerythritol.

When the polymeric particles include carboxylic acid and/or amino functional groups at the surface, chemical modification may take place through these functional groups. In one example, the polymeric particles including the carboxylic acid and/or amino functional groups at the surface may be treated with an amino compound having the general structure RNH R' XR", where R is H or an alkyl group with 1 to 18 carbon atoms; R' is a divalent linking group (such as an alkylene or arylene); XR" together is H, or X is selected from O, COO, OCO, CONH, NHCO, or CO, and R" is selected from H or an alkyl group with 1 to 18 carbon atoms. During the treatment of the particles with the amino compound, the corresponding salt(s) or amido group(s) may be formed on the surface of the particles. Not to be bound by any particular theory, but the addition of the salt(s) or amido group(s) at the surface of the particles may improve interlayer adhesion, enable better flow when the particles melt, and/or adjust the hydrophobicity of the 3D object that is formed.

The polymeric particles including the carboxylic acid and/or amino functional groups at the surface may be treated with an alcohol having the general structure of HOR'XR", where R' is a divalent linking group (e.g., an alkylene or arylene); XR" together is H, or X is selected from O, COO, OCO, CONN, NHCO, or CO and R" is selected from H or an alkyl group with 1 to 18 carbon atoms. During the treatment of the particles with the alcohol, an ester group may be formed on the surface of the particles. The addition of the ester group(s) at the surface of the particles may also improve interlayer adhesion, enable better flow when the particles melt, and/or adjust the hydrophobicity of the 3D object that is formed.

In another example, the polymeric particles including the amino functional groups at the surface are treated with chloro or alkoxy silanes. The general structure of a suitable silane is YSi($R_2$)R", where Y is Cl, $OCH_3$, or $OCH_2CH_3$; R is an alkyl or alkoxy group with 1 to 18 carbon atoms; and R" is an alkyl group with 1 to 18 carbon atoms or an alkyl group with substituent groups having 1 to 18 carbon atoms. Similar to salt(s), amido group(s), and ester group(s), the addition of the silane group(s) at the surface of the particles may improve interlayer adhesion, enable better flow when the particles melt, and/or adjust the hydrophobicity of the 3D object that is formed.

The particles may be present in the form of a powder, a liquid, a paste, or a gel. Examples of the polymer in the particles include semi-crystalline thermoplastics with a processing window of greater than 5° C.—i.e., the temperature range between the melting temperature and the re-crystallization temperature). In an example, the processing window ranges from 15° C. to about 30° C. Some examples of the polymer include polyamides, such as nylons—e.g., nylon or PA 11 ("PA-11"), nylon or PA 12 ("PA-12"), nylon or PA 6 ("PA-6"), nylon or PA 8 ("PA-8"), nylon or PA 9 ("PA-9"), nylon or PA 66 ("PA-66"), nylon or PA 612 ("PA-612"), nylon or PA 812 ("PA-812"), nylon or PA 912 ("PA-912"), etc. Other examples of the polymer include polyethylene, polyethylene terephthalate (PET), and amorphous variations of these materials. Other examples of suitable polymer includes polystyrene, polyacetal, polypropylene, polycarbonate, polyester, thermal polyurethane, other engineering plastic, and blends of any two or more of the polymers listed herein. Core-shell polymeric particles of these materials may also be used.

The polymer in the particles may have a melting temperature of any suitable value, depending on the material involved. For example, the melting temperature may range from about 50° C. to about 480° C. In one example, it is desirable that the melting temperature of the polymer be lower than the melting temperature of an inorganic salt used in the modifier agent (which is described further below), should such a modifier agent be present. For example, polyamide 12 having a melting temperature of about 180° C. may be employed, or polyurethanes having a melting temperature ranging from about 100° C. to about 165° C. may be employed. When polymeric particles comprising a combination of different types of polymers are employed, at least one of the particles has a melting temperature below the melting temperature of the inorganic salt in the modifier agent, in one example, each of the plurality of polymeric particles has a melting temperature below the melting temperature of the inorganic salt.

The layer comprising the polymeric particles may additionally comprise a charging agent, a flow aid, or combinations thereof. A charging agent may be added to suppress tribe-charging. Examples of a suitable charging agent include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2, (fatty acid ester), and HOSTASTAT® HS 1 (alkane sulfonate), each of which is available from Clariant Int. Ltd.). In one example, the charging agent is added in an amount ranging from greater than about 0 wt % to less than about 5 wt % based upon the total wt % of the particles. Other amounts of the charge agent are also possible.

Flow aid(s) may be added to improve the coating flowability of the polymeric particles. Flow aid(s) may be desirable when the particles have an average diameter of less than about 25 μm in size. The flow aid may improve the flowability of the polymeric particles by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570) or polydimethylsiloxane (E900). In one example, the flow aid is added in an amount ranging from greater than 0 wt % to less than 5 wt % based upon the total wt % of the particles.

Coalescent Fluid

The coalescent fluid described herein facilitate forming a 3D object may comprise a liquid suspension. The liquid suspension may contain any suitable number of components. For example, the liquid suspension of the coalescent fluid may contain at least one coalescent agent. The coalescent agent may be energy-absorbing, such as radiation-absorbing. The energy may refer to radiant energy. Examples of the suitable liquid suspension described herein include an aqueous dispersion containing at least one coalescent agent. The radiation-absorbing agent may be an infrared light absorber, a near infrared light absorber, or a visible light absorber.

Absorption herein may refer to attenuation of the energy of a beam (light, electrons, etc.) on passage through a matter. The dissipated energy as a result in this instance may be converted into other forms of energy (e.g., heat). An absorber may refer to a piece of matter, or body, intended to absorb radiation. An absorber herein may absorb all of, or a major proportion of, radiation in the region from 100 nm to 1 mm. The radiation may be non-monochromatic and/or non-coherent and/or non-oriented, of wavelength from 100 nm to 1 mm, such as via a radiative heater or any other energy source described in this disclosure herein. In one example, the polymeric particles in the pulverulent layer generally are incapable, or insufficiently capable, of absorbing the radiation from the radiation energy source. "Insufficiently" in this context may refer to that absorption of radiation via an energy source of a wavelength from about 100 nm to about 1 mm does not heat the pulverulent layers sufficiently to enable it to bond via fusion or sintering to adjacent pulverulent layer particles. In one example, the absorption herein may refer to a subset of the about 100 nm to about 1 mm range—e.g., between about 700 nm and about 1400 nm.

The coalescent agent may be a pigment-based or a dye-based ink. In one example, the ink may comprise visible light enhancer(s) as the active agent. The coalescent agent described herein may comprise, or be, a one-time-use absorber. In one example, the coalescent agent comprises a radiation-absorbing molecule having an energy-absorbing functional group that (thermally) decomposes at a temperature just above a melting temperature of the polymeric particles in the underlying pulverulent layer. In the case where the pulverulent layer has multiple types of polymeric particles, the thermal decomposition temperature may be at a temperature just above any of the melting temperatures of the different types of the polymeric particles—e.g., the lowest, highest, or any one in between of the different melting temperatures. In one example, the thermal decomposition temperature may be at a temperature just above the highest melting temperature of the different types of the polymeric particles. In one example, the coalescent agent is a one-time-use absorber because the coalescent agent absorber becomes ineffective in absorbing the (radiation) energy, or effectively losing the energy-absorbing functionality, after the agent has absorbed the energy once and has caused the polymeric particles to fuse. In one example, after the coalescent agent has absorbed the energy once, the coalescent agent becomes non-energy-absorbing. In one example, upon exposure to a radiation energy, at least some of the coalescent agent thermally decomposes, and this thermal decomposition causes at least some of the particles of the pulverulent layer to fuse to one another.

The coalescent agent described herein may comprise any material having a thermal decomposition temperature lower than or equal to a melting temperature of the polymer in the polymeric particles, as described above. The thermal decomposition temperature may be determined by ASTM E2550-11. In one example, the thermal decomposition temperature is determined using thermo gravimetric analysis using TA instrument. In this example, about 10 mg of the sample is taken in the ceramic cup and heated to about 800° C. from the ambient temperature under argon atmosphere at 10° C./min. The weight loss is monitored with respect to temperature; then it is calculated using Universal Analysis 2000 software based on the loss of weight. Based on the plot, the step transitions are identified with >15% weight loss over the temperature range, and then a most probable tangent is drawn between those selected region. The tangent where it meets the upper step range is defined as the onset of the decomposition temperature, and the onset is deemed the decomposition temperature. The foregoing description is employed in one example, and other suitable techniques, including equipment or parameters, may be used to determine the thermal decomposition temperature.

The thermal decomposition temperature may be of any suitable value, depending on the materials involved. In one example, the thermal decomposition temperature is between about 5° C. and about 50° C. above the working temperature of the polymeric particles in the pulverulent layer. In one example, the working temperatures is between about 10° C. and about 25° C. below the melting temperature of the polymer of the polymeric particles. In another example, the working temperatures is between about 10° C. and about 25° C. above the melting temperature of the polymer of the polymeric particles. For example, the thermal decomposition temperature is between about 5° C. and about 50° C. lower than or equal to a melting temperature of the polymer (e.g., thermoplastic) of the polymeric particles—e.g., between about 8° C. and about 40° C. lower than or equal to, between about 10° C. and about 30° C. lower than or equal to, between about 15° C. and about 20° C. lower than or equal to, etc. Other values are also possible. In one example, the thermal decomposition temperature is between about 10° C. and about 25° C. lower than or equal to a melting temperature of the polymer (e.g., thermoplastic) of the polymeric particles.

The coalescent agent described herein may comprise any suitable material. In one example, the coalescent agent decomposes thermally at a certain temperature, such as one lower than or equal to about the melting temperature of the polymeric particles in the underlying base pulverulent layer. The coalescent agent may be, for example, a synthetic polymer. Any material having the aforedescribed thermal decomposition property may be suitable as a coalescent agent described herein. For example, the coalescent agent may comprise at least one of a cyanine, a dithiolene, a triarylene, a phthalocyanine, a naphthalocyanine, and a tetraaryldiamino phenylene. Examples of a suitable coalescent agent include commercially available dyes, such as FHI 963131 (in water) and FHI 9632, available from Fabricolor Holding International LLC, NJ, USA; both of these dyes have a maximum absorption of 963 nm and poor thermal stability. Additional examples include dyes FHI 9932, 10102, 10122, 10142, 10232, 10482, and 10662, also available from Fabricolor Holding International LLC, NJ, USA.

The coalescent agent may not thermally decompose, such as at the working temperature of the underlying base pulverulent layer. In one example, this non-thermally decomposing coalescent agent may comprise carbon black (pigment), such as, for example, the ink formulation commercially known as CM997A available from Hewlett-Packard Company, Examples of inks including visible light enhancers are dye-based colored inks and pigment-based colored inks, such as the commercially available inks CE039A and CE042A, available from Hewlett-Packard Company. Not to be bound by any particular theory, but the aqueous nature of some coalescent agent may enable the coalescent agent to penetrate and infiltrate the base layer comprising polymeric particles. For hydrophobic polymeric particles the presence of a co-solvent and/or a surfactant in the coalescent agent may assist in obtaining the desired wetting. One or more coalescent agents may be dispensed to form each object slice (of the final resultant 3D object).

The carbon black pigment may act as a radiation absorbing agent or active material. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVE® series manufactured by Columbian Chemicals Company, Marietta, Ga., (such as, e.g., RAVEN® 5750, RAVEN® 5250, RAVEN® 5000, RAVEN® 3500 RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

The carbon black pigment particles may be polymerically dispersed in the coalescent agent by a polymeric dispersant having a weight average molecular weight ranging from about 12,000 to about 20,000. In some of the examples disclosed herein, the carbon black pigment is initially in the form of a water-based pigment dispersion. The water-based pigment dispersion includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the water-based pigment dispersion, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

The amount of the carbon black pigment that is present in the coalescent agent ranges from about 3.0 wt % to about 6.0 wt % based on the total wt % of the coalescent agent. In other examples, the amount of the carbon black pigment present in the coalescent agent ranges from greater than about 4.0 wt % up to about 6.0 wt %. It is believed that these pigment loadings provide a balance between the coalescent agent having jetting reliability and electromagnetic radiation absorbance efficiency. When the carbon black pigment is present the water-based pigment dispersion, the amount of the water-based pigment dispersion that is added to the coalescent agent may be selected so that the amount of the carbon black pigment in the coalescent agent is within the given ranges.

The coalescent agent may comprise water soluble near-infrared absorbing dyes with absorptions in the range of about 800 nm to about 1400 nm as the main component in the coalescent agent. In one example, the fusing lamp in an LAP process emits radiation energy (e.g., light) over the about 800 nm to about 1400 nm range. In one example, using a near-IR ("NIR") absorbing dye as the coalescent agent (or a part thereof) may overcome a challenge of creating a resultant product that is black or grey in color and has poor visual uniformity (or optical density), sometimes as a result of using carbon black. An NIR absorbing dye may achieve the desired fusing efficiency and improve the color uniformity. In one example, the maximum emissive light occurs at around 1100 nm and quickly forms a tail end. Thus, in this example in order to maximize the absorption, the dyes employed should have similar absorption range for maximum efficiency. In addition, colored parts with a wide spectrum of color gamut may be obtained with incorporation of colored pigments and dyes. In one example, solvent soluble dyes in the absorption range of about 800 nm to about 1400 nm are dispersed with surfactants. Presence of such surfactants (or any such additives) may impact the thermal properties of the base polymeric particle pulverulent layer, thus affecting the quality (e.g., mechanical properties) of the resultant 3D object. Thus, in one example water soluble dyes or compounds that have absorptions in the about 800 nm to about 1400 nm range are employed as to increase, or even maximize, the absorption of fusing emissive lamp. These dyes may be washed off at the end so that the surface of the part does not contain any residual dyes. In one example, the coalescent agent is an organic near-infrared dyes, which are stable in the ink formulation.

The NIR dyes may be any of the suitable commercially available NIR dyes and maintain their solubility in the presence of co-solvent in the designated ink vehicles. In one example, experiments with nylon and thermoplastic polyurethane ("TPU") powder particles using the NIR dyes as a coalescent agent show these dyes as strong heat generators upon exposure to a fusing lamp, similar to the process with carbon black based ink as a coalescent agent.

The amount of coalescent needed to achieve good powder fusing may be of any suitable value, depending on the material involved. In one example, the amount is in the range of about 0.5 wt % to about 8 wt % with respect to the powders e.g., about 1 wt % to about 6 wt %, about 2 wt % to about 4 wt %, etc. Other values are also possible. In one example, with a concentration of less than about 2.5 wt %, the final object obtained resembles closely the natural white color of nylon or TPU powders. In one example, these dyes are formulated into water-based inkjet ink dispersions and show reasonably good jetting performance. In one example, to obtain colored 3D objects, various colored organic and/or inorganic pigments are added to the ink dispersions so that they may be introduced during the layer-by-layer fabrication process. In another example, primary color inkjet ink pens may be used for generating colored objects in addition to the pen with near infrared dyes.

The coalescent agent may comprise an anti-kogation agent. Kogation may refer to the deposit of dried ink (e.g., coalescent agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® O3A or CRODAFOS® N-3 acid from Croda), or a combination of oleth-3-phosphate and a low molecular weight (e.g., <5000) polyacrylic acid polymer (e.g., commercially available as CARBOSPERSE® K-7028 Polyacrylate from Lubrizol). Whether a single anti-rogation agent is used or a combination of anti-rogation agents is used, the total amount of anti-rogation agent(s) in the coalescent agent may range from greater than 0.20 wt % to about 0.62 wt % based on the total wt % of the coalescent agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

The coalescent agent may also include a chelator, a biocide/antimicrobial, and/or combinations thereof. The chelator may be added in any amount ranging from about 0.03 wt % to about 0.10 wt % based on the total weight of the coalescent agent. An example of a suitable chelator includes TRILON® (an aminopolycarboxylate, available from BASF Corp.). The biocide or antimicrobial may be added in any amount ranging from about 0.30 wt % to about 0.40 wt % with respect to the total weight of the coalescent agent. Examples of suitable biocides/anti-microbials include PROXEL® GXL (an aqueous solution of 1,2-benzisothiazolin-3-one, available from Arch Chemicals, Inc.) and KORDEK® MLK (a formaldehyde-free microbicide from the Dow Chemical Co.).

The liquid suspension may additionally comprise at least one coalescence modifier agent. A suitable coalescence modifier agent may separate individual polymeric particles to prevent the particles from joining together and solidifying as part of an object slice. Examples of a coalescence modifier agent include colloidal, dye-based, and polymer-based inks, as well as solid particles that have an average size less than the average size of the polymeric particles descried herein. The molecular mass of the coalescence modifier agent and its surface tension may be such that it enables the agent to penetrate sufficiently into the polymeric particles and infiltrate into the cavities between the particles to achieve the desired mechanical separation. In one example, a salt solution is employed as a coalescence modifier agent. In another example, inks commercially known as CM996A and CN673A available from Hewlett-Packard Company are employed as a coalescence modifier agent.

Suitable coalescence modifier agents may act to modify the effects of a coalescent agent by preventing polymeric particles from reaching temperatures above its melting temperature during heating. A fluid that exhibits a suitable cooling effect may be used as this type of coalescence modifier agent. For example, when polymeric particles is treated with a cooling fluid, energy applied to the polymeric particles may be absorbed, evaporating the fluid to help mitigate, minimize, or prevent polymeric particles from reaching their melting temperature(s). Thus, for example, a fluid with a high water content may be a suitable coalescence modifier agent.

Other types of coalescence modifier agents may be used. An example of a coalescence modifier agent, which may increase the degree of coalescence, may include, for example, a plasticizer. Another example of a coalescence modifier agent, which may increase the degree of coalescence, may include a surface tension modifier to increase the wettability of the polymeric particles.

The modifier agent may act to mitigate, minimize, or even prevent thermal bleed, such as to improve the surface quality, of the object slice and/or the final resultant 3D object. For example, the modifier agent may include an inorganic salt, a surfactant, a co-solvent, a humectant, a biocide, and water. In one example, the modifier agent consists of these components. It has been found that this particular combination of components may effectively reduce or prevent coalescence bleed, at least in part because of the presence of the inorganic salt. In one example, an inorganic salt employed in the modifier agent has a relatively high heat capacity, but a relatively low heat emissivity. These characteristics may render the modifier agent capable of absorbing the radiation (and its associated thermal energy) applied thereto, and also capable of retaining a bulk of the thermal energy therein. As such, very little, if any, of the thermal energy may be transferred from the modifier agent to the polymeric particles.

In addition, the aforementioned inorganic salt may have a lower thermal conductivity and/or a higher melting temperature than the thermal conductivity and/or melting temperature of the polymeric particles, and, in some instances, of the active material in the coalescent agent. In one example, upon absorbing radiation and thermal energy, the inorganic salt does not melt and also does not transfer a sufficient amount of heat to the surrounding polymeric particles. As a result, in this example the modifier agent effectively reduces curing/fusing of the polymeric particles when polymeric particles are in contact with both the coalescent agent and the modifier agent, and prevent curing when the polymeric particles are in contact with the modifier agent alone.

An inorganic salt in the modifier agent may be water soluble. Examples of a suitable water soluble inorganic salt include sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof. The inorganic salt may be present in am amount ranging from about 5.0 wt % to about 50 wt % with respect to a total weight of the modifier agent. Other values are also possible.

The modifier agent may also include a surfactant. The type and amount of the surfactant may be selected so that a contact angle thereof with the polymeric particles is less than 45°. The components of the modifier agent may be mixed together, and then the amount of surfactant adjusted to achieve the desirable contact angle. In one example, a suitable amount of surfactant to achieve the desired contact angle ranges from about 0.1 wt % to about 10 wt % with respect to the total weight of the modifier agent. Examples of suitable surfactants include tetraethylene glycol, ethylene glycol 1 (e.g., LIPONIC® EG-1 from Lipo Chemicals, Inc., NJ, USA), a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL® FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants with a hydrophilic-lipophilic balance ("HLB") less than 10 include non-ionic wetting agents and molecular defoamers (e.g., SURFYNOL® 104E from Air Products and Chemical Inc.) or water-soluble, non-ionic surfactants (e.g., TERGITOL® TMN-6 from The Dow Chemical Company). A fluorosurfactant may also be added to the surfactant having the HLB less than 10 in order to improve the wetting of the build material. As such, in another example, the coalescent includes a combination of the surfactant with the HLB less than 10 (e.g., the self-emulsifiable surfactant based on acetylenic diol chemistry) and a non-ionic fluorosurfactant (e.g., CAPSTONE® FS-35 from DuPont). The surfactant may contribute at least in part to filling the cavities between the polymeric particles in the layer.

Whether a single surfactant or a combination of surfactants is used, the total amount of surfactant(s) in the coalescent agent may range from about 0.5 wt % to about 1.4 wt % based on the total wt % of the coalescent agent, and in some instances, the coalescent fluid. In an example, the surfactant having the HLB less than 10 is included in an amount ranging from about 0.5 wt % to about 1.25 wt %, and the fluorosurfactant is included in an amount ranging from about 0.03 wt % to about 0.10 wt %.

As noted above, the modifier agent may include a co-solvent, a humectant, and/or a biocide. In one example, a co-solvent is present in an amount ranging from about 1.0 wt % to about 32 wt %, a humectant in an amount ranging from about 0.1 wt % to about 15 wt %, and a biocide in an amount ranging from about 0.01 wt % to about 5 wt %, each of which is with respect to the total weight of the modifier agent. Other values are also possible. Suitable co-solvents include 2-hydroxyethyl-2-pyrollidinone, 2-pyrollidinone, 1,6-hexanediol, and combinations thereof. Suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol polydextrose, quillaia, glycerin, 2-methyl-1,3-propanediol, and combinations thereof. The co-solvent may have a boiling temperature of less than or equal to about 300° C. In some examples, the co-solvent has a boiling temperature of less than or equal to about 250° C. Some examples of the single co-solvent include 2-pyrrolidinone, 1,5-pentanediol, triethylene glycol, tetraethylene glycol, 2-methyl-1,3-propanediol, 1,6-hexanedol, and tripropylene glycol methyl ether. The coalescent agent may include one of the listed co-solvents alone, or two or more of the listed co-solvents in combination, and excludes other co-solvents. In one example, when the co-solvent is 2-pyrrolidinone, the co-solvent 2-pyrrolidinone alone is included. In another example, when the co-solvent is a combination of 2-pyrrolidinone and 1,5-pentanediol, these solvents alone are included.

Suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lanza Ltd. Corp.), and an aqueous solution of methylisothiazolone (e.g., KORDEK® MLX from the Dow Chemical Co.).

The coalescent agent may include water (e.g., deionized water), a co-solvent having a boiling point less than 300° C. a surfactant having a hydrophilic lipophilic balance of less than 10, and a polymerically dispersed carbon black pigment. The amount of water in the coalescent agent may vary depending upon the amounts of the other components, but the water makes up a balance of the coalescent agent (i.e., a total wt % of the coalescent agent is 100).

3D Printing 3D printing is a printing process that may be employed to fabricate (solid) 3D objects from a digital model. 3D printing may be employed in rapid product prototyping, mold generation, and mold master generation. 3D printing techniques are often considered additive manufacturing processes because they may involve the application/generation of successive layers of material. An additive manufacturing process differs from other machining processes that rely upon the removal of material to create the final object. Materials used in 3D printing often need to undergo fusing, which for some materials may be accomplished using heat-assisted extrusion or sintering, and for other materials may be accomplished using digital light projection technology.

As described above, one example of 3D printing is LAP. An LAP method may involve any suitable process(es). LAP may have lower cost and achieve faster throughput with good accuracy and roughness, in comparison to a sintering technique.

In one example, LAP involves layer by layer deposition of polymeric particles (e.g., nylon or thermoplastic polyurethane ("TPU"), etc.) of various sizes. In this example, these particles (in the pulverulent layers) are pre-heated close to about 150° C., and then a coalescent agent is selectively disposed over the region in a layer where the object is to be formed. The disposition may involve at least one of a thermal inkjet printer and a piezoelectric printer. Then the whole layer is exposed to high intensity fusing lamp(s) with emissive wavelength of between about 900 nm and about 1400 nm to be absorbed by the coalescent agent. The absorbed energy then transformed to thermal energy. During this time, the polymer powder particles may be melted or sintered by raising its temperature close to their melting temperature. To fuse powder particles within the object cross section area and simultaneously fuse this area to underlying solidified part of the 3D object, if any; in an area of the powder the temperature of the powder is raised to (or above) a melting temperature of powder material and allowed to cool and solidify. The absorber may be dye- or pigment-based and is printed using inkjet technology. Accuracy of the object shape may be determined by control over the position of melt-powder interface in the plane of the powder. The next pulverulent layer (of the polymeric particles) is layered on top of the underlying layer, and the process is repeated till the desired final 3D object is formed.

Figure 3:
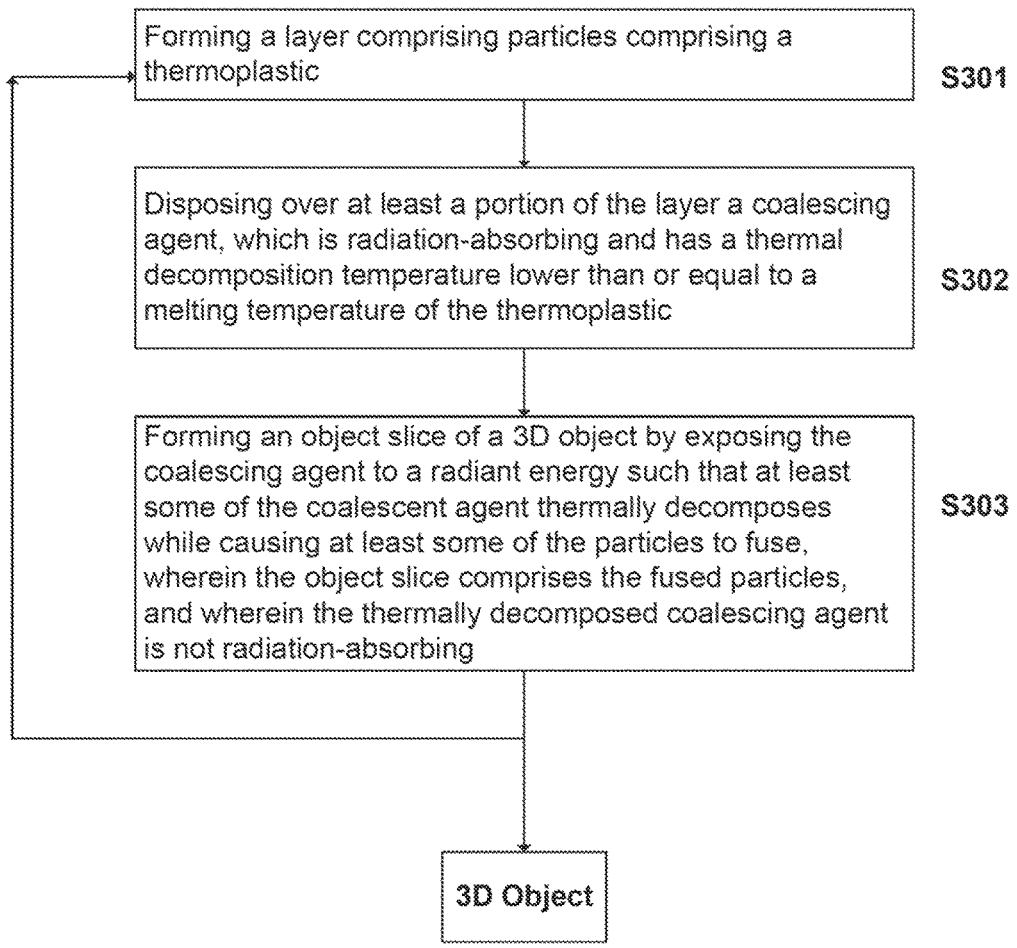
FIG. 3 provides a flowchart illustrating one example of a 3D printing process described herein.

FIG. 3 illustrates one example of the processes in one LAP method. In this example, a layer comprising particles comprising a thermoplastic is formed (S301). Then a coalescent agent is disposed over at least a portion of the layer (S302). The coalescent agent may be radiation-absorbing and have a thermal decomposition temperature lower than or equal to a melting temperature of the thermoplastic. Subsequently, an object slice of a 3D object is formed by exposing the coalescent agent to a radiant energy such that at least some of the coalescent agent thermally decomposes while causing at least some of the particles to fuse (S303). The object slice may comprise the fused particles, and the thermally decomposed coalescent agent may be not radiation-absorbing. The fusion between the particles may occur at the respective boundary of each of the fused ink particles, due for example to at least partial melting and/or sintering between the particles. While the originally spherical ink particles are no longer individually spherical after the fusion, the original spherical shape of each of the ink particles in the fused particle clusters may still be discerned at least visually (such as using electron microscopy). Finally, any combination of the processes S301 to S303 may be repeated to form the 3D object comprising multiple object slices bound depth-wise to one another. A printing system comprising various suitable devices, including an energy source, and a controller to execute (machine-readable) instructions to cause these devices to perform the aforementioned processes is also provided.

In the example as illustrated in FIG. 3, the object slice may be at least substantially free of the coalescence agent and the thermally decomposed coalescence agent. Also, the object slice may be at least substantially free of the coalescence agent and comprising the thermally decomposed coalescent agent, which is not radiation-absorbing and not volatile. A non-volatile (thermally decomposed) coalescent agent may be non-toxic and/or non-reactive. In this example, during the thermal decomposition, the exposing may cause the at least some of the particles to melt before fusing and the coalescent agent to infiltrate the layer to create in the layer a depth-wise concentration gradient of the coalescent agent.

Figure 4:
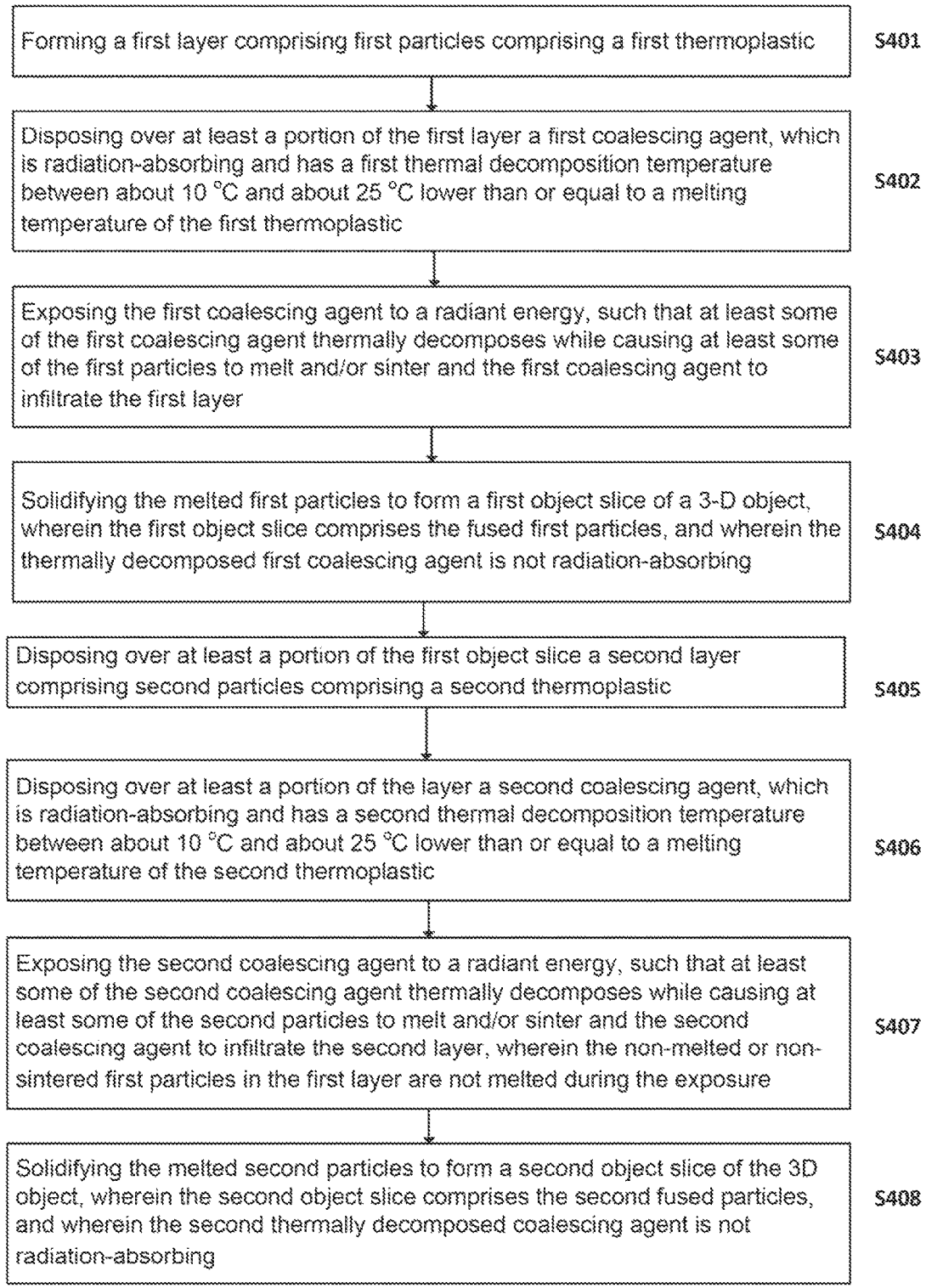
FIG. 4 provides a flowchart illustrating another example of 3D printing process described herein.

FIG. 4 illustrates another example of the processes in one LAP method. In this example, a first layer comprising first particles comprising a first thermoplastic is formed (S401). Then a first coalescing is disposed over at least a portion of the first layer (S402). The coalescent agent may be radiation-absorbing and have a first thermal decomposition temperature between about 10° C. and about 25° C. lower than or equal to a melting temperature of the first thermoplastic. The first coalescent agent is exposed to a radiant energy, such that at least some of the first coalescent agent thermally decomposes while causing at least some of the first particles to melt and/or sinter and the first coalescent agent to infiltrate the first layer (S403). The melted first particles are then solidified to form a first object slice of a three-dimensional object, wherein the first object slice comprises the fused first particles, and wherein the thermally decomposed first coalescent agent is not radiation-absorbing (S404). Subsequently, a second layer comprising second particles comprising a second thermoplastic is disposed over at least a portion of the first object slice a second layer comprising second particles comprising a second thermoplastic (S405). Then a second coalescent agent is disposed over at least a portion of the layer a second coalescent agent (S406). The coalescent agent may be radiation-absorbing and have a second thermal decomposition temperature between about 10° C. and about 25° C. lower than or equal to a melting temperature of the second thermoplastic. Then the second coalescent agent is exposed to a radiant energy, such that at least some of the second coalescent agent thermally decomposes while causing at least some of the second particles to melt and/or sinter and the second coalescent agent to infiltrate the second layer, wherein the non-melted or non-sintered first particles in the first layer are not melted or sintered during the exposure (S407). The melted second particles are then solidified to form a second object slice of the three-dimensional object, wherein the second object slice comprises the second fused particles, and wherein the second thermally decomposed coalescent agent is not radiation-absorbing (S408). Additionally, any combination of the processes S401 to S408 may be repeated to form the 3D object comprising multiple object slices bound depth-wise to one another. A printing system comprising various suitable devices, including an energy source, and a controller to execute (machine-readable) instructions to cause these devices to perform the aforementioned processes is also provided.

Figure 2:
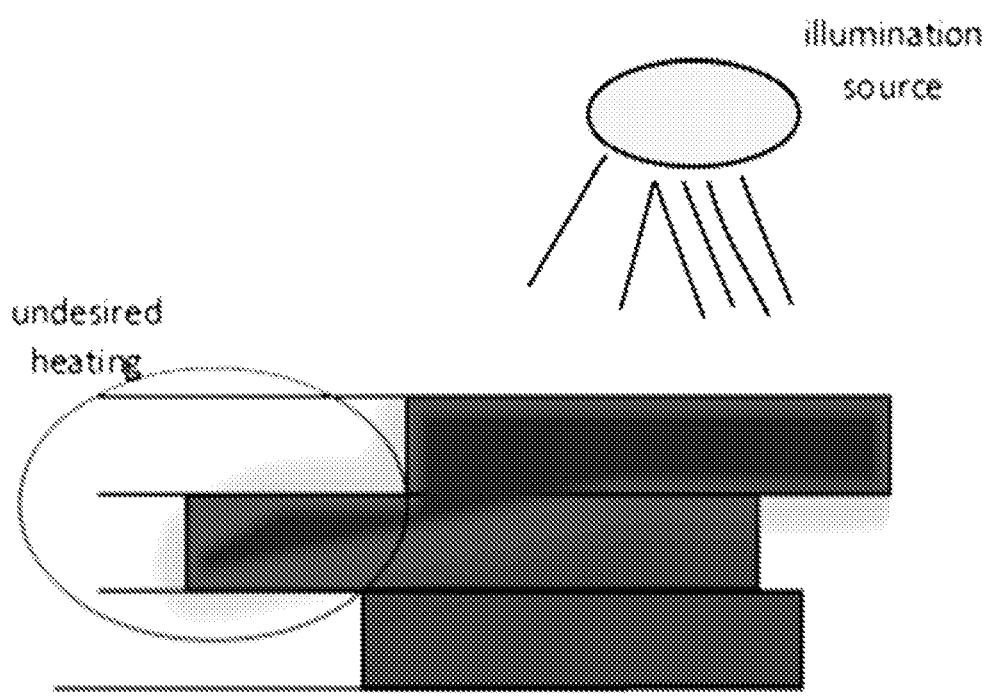
FIG. 2 provides a schematic showing, in one example, undesired heating by an absorber of a coalescent agent in underlying powder layers that protrude outside presently printed layer.

In the example as illustrated in FIG. 4, the first and the second object slices need not be perfectly aligned with each other. In one example, a portion of the second object slice overhangs the first object slice, and as shown in the schematic of FIG. 2. The lack of alignment may also take the form of the second object slice protruding out of the third object slice, as shown in the schematic of FIG. 2. It is noted that the method as shown in FIG. 4 may mitigate, minimize, or even prevent, the challenge as shown in FIG. 2. The first thermoplastic and the second thermoplastic may comprise the same or different materials. In one example, the first thermoplastic and the second thermoplastic comprise different materials. In another example, the first thermoplastic and the second thermoplastic comprise the same material(s). Additionally, the first coalescent agent and the second coalescent agent may comprise the same or different materials. In one example, the first coalescent agent and the second coalescent agent comprise different materials. In another example, the first coalescent agent and the second coalescent agent comprise the same material(s).

The sequence of sections presented in FIGS. 5A-5E illustrate one example of manufacturing a three-dimensional object 44. An example of the 3D printing method using an example of the polymeric particle composition 10 disclosed herein is shown in FIGS. 5A through 5E. The 3D printing method as shown in FIGS. 5A-5E is an LAP method. In one example, during light area processing, an entire layer of the polymeric particle composition 10 is exposed to radiation, but only a selected region of the polymeric particle composition 10 is fused and hardened to become a layer of a 3D object. In another example, the entire region of the polymeric particle composition 10 is fused. In the example as shown in FIGS. 5A-5E, a coalescent agent is selectively deposited in contact with the selected region of the polymeric particle composition 10. The coalescent agent penetrates (partially or fully) into the layer of the polymeric particle composition 10 and infiltrates the cavities present in between the particles in the polymeric particle composition 10. The coalescent agent is capable of absorbing radiation and converting the absorbed radiation to thermal energy, which in turn melts and/or sinters the particles 12, 14, 16 that are in contact with the coalescent agent. This causes the polymeric particle composition 10 to fuse, bind, cure, etc. to form the layer of the 3D object.

As illustrated in FIGS. 5A-5E, the respective particles 12, 14, 16 of the polymeric particle composition 10 may be formed of the same type of polymer, or of different types of polymers, or some of the particles 12, 14 may be formed of the same type of polymer and the other particles 16 may be formed of a different type of polymer. The polymer may be any of those aforedescribed with respect to polymeric particles. It is noted that while particles 12, 14, and 16 are depicted in FIGS. 3A-3E as three different types (e.g., size, compositions, and the like) for illustration purpose, the methods and the layers described herein need not have any particular number of different types. The particles 12, 14, and 16 may also have the same material chemistry.

Figure 5A:
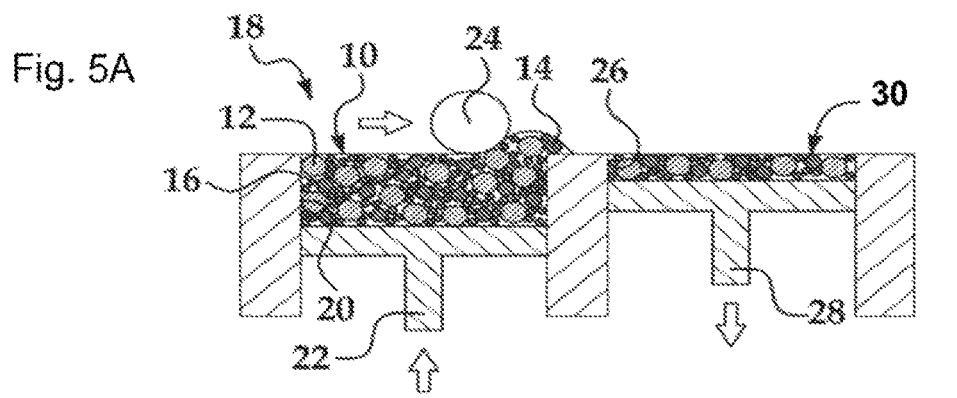
FIGS. 5A-5E provide schematic diagrams illustrating cross-sectional views of the processes involved in one example of forming object slices of a 3D object using an example of a 3D printing method described herein.

In the example shown in FIG. 5A, a printing system 18 for forming the 3D object includes a supply bed 20 (including a supply of the polymeric particle composition 10), a delivery piston 22, a roller 24, a fabrication bed 26, and a fabrication piston 28. Each of these physical elements may be operatively connected to a central processing unit (not shown) of the printing system 18. The central process unit may comprise, or be, a controller. The central processing unit (e.g., running machine-readable instructions stored on a non-transitory, tangible machine-readable storage medium) may manipulate and transforms data represented as physical (electronic) quantities within the printer's registers and memories in order to control the physical elements to create the 3D object. The machine herein may refer to a processor, such as a computer. The data for the selective delivery of the polymeric particle composition 10, the coalescent agent, etc. may be derived from a model of the 3D object to be formed.

The delivery piston 22 and the fabrication piston 28 may be the same type of piston, but are programmed to move in opposite directions. In one example, when a first object slice (layer) of the 3D object is to be formed, the delivery piston 22 may be programmed to push a predetermined amount of the polymeric particle composition 10 out of the opening in the supply bed 20, and the fabrication piston 28 may be programmed to move in the opposite direction of the delivery piston 22 in order to increase the depth of the fabrication bed 26. The delivery piston 22 may advance enough so that when the roller 24 pushes the polymeric particle composition 10 into the fabrication bed 26, the depth of the fabrication bed 26 is sufficient so that a layer 30 of the polymeric particle composition 10 may be formed over the bed 26 (acting as a substrate). In one example, the layer 30 disposed over the bed 26 comprises a mono-layer of the polymeric particle composition 10. The roller 24 is capable of spreading the polymeric particle composition 10 into the fabrication bed 26 to form the layer 30, which may be relatively uniform in thickness. In one example, the thickness of the layer 30 ranges from about 98 µm to about 110 µm, although thinner or thicker layers may also be formed and employed.

The roller (coater) 24 may be replaced by, or employed in addition to, other tools, such as a blade coater that may be desirable for spreading different types of powders.

Figure 5B:
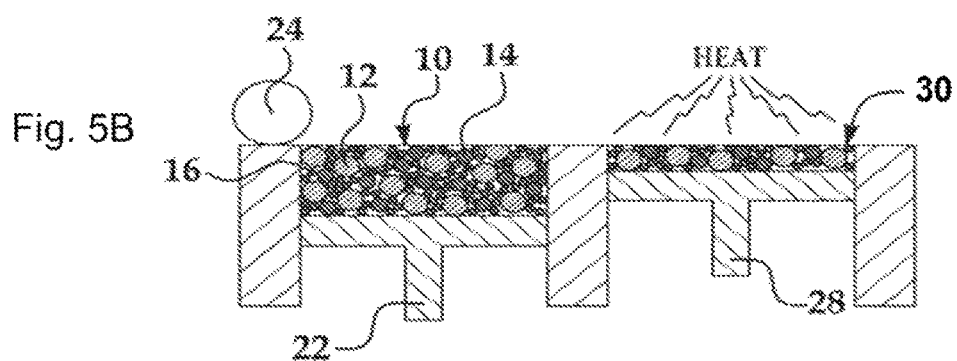

In this example, after the layer 30 comprising the polymeric particle composition 10 is formed over the fabrication bed 26, the layer 30 is exposed to heating (as shown in FIG. 5B) to bring the particles to a working temperature. Heating may be performed to pre-heat the polymeric particle composition 10, and thus in some examples it is desirable that the particles are pre-heated to a working temperature below the lowest melting temperature of the polymeric particles 12, 14, 16 in the polymeric particle composition 10. For example, this working temperature may be between about 2° C. below and about 100° C. below the melting temperature of the polymeric particles—e.g., between about 5° C. below and about 50° C. below, between about 10° C. below and about 30° C. below, etc. Other temperature values are also possible. In one example, the particles are pre-heated to a temperature between about 10° C. and about 25° C. below the melting temperature of the thermoplastic of the particles. As such, the temperature selected will depend upon the polymeric particle composition 10 that is employed. In one example, the (pre-) heating temperature ranges from about 50° C. to about 350° C. In another example, the heating temperature ranges from about 60° C. to about 170° C. Other temperatures are also possible.

Pre-heating the layer 30 of the polymeric particle composition 10 may be accomplished using any suitable heat source that exposes the polymeric particle composition 10 in the fabrication bed 26 to the heat. Examples of suitable heat sources include thermal or light radiation sources.

Figure 5C:
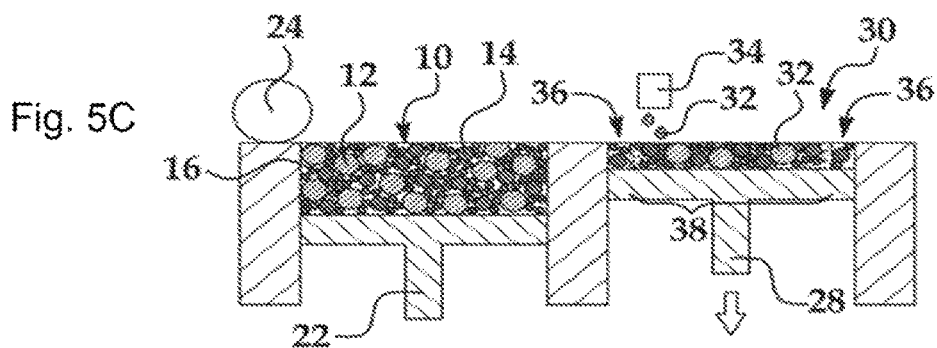

After pre-heating the layer 30, a liquid suspension 32 (e.g., of the aforementioned coalescent fluid), which may contain a coalescent agent, is selectively applied on at least a portion of the polymeric particle composition 10 in the layer 30, as shown in FIG. 5C. In one example, the liquid suspension 32 comprises a coalescent agent, such as any of those described herein. Examples of suitable liquid suspension 32 includes an aqueous dispersion containing at least one coalescent agent. The coalescent agent may comprise a radiation absorbing binding agent. As described above, examples of the coalescent agent include an infrared light absorber, a near infrared light absorber, or a visible light absorber, such as any of those described herein.

As illustrated in FIG. 5C, the liquid suspension 32 is dispensed from an inkjet distributor 34. The distributor 34 may be any suitable printhead, such as a thermal inkjet printhead or a piezoelectric inkjet printhead. The distributor 34 may comprise at least one printhead. While a single printhead is shown in FIG. 5C, multiple printheads may be used that span the width of the fabrication bed 26. The distributor 34 may be attached to a moving XY stage (not shown) that moves the distributor 34 adjacent to the fabrication bed 26 in order to dispose the liquid suspension 32 in desirable area(s) 38. The distributor 34 may be programmed to receive commands from the central processing unit, particularly the controller thereof, and to dispose the liquid suspension 32 according to a pattern for the first layer of the 3D object. The distributor 34 may selectively apply the liquid suspension 32 on those portions of the layer 30 that are to be fused to become the first layer of the 3D object. As an example, if the first layer is to be shaped like a cube or cylinder, the liquid suspension 32 will be deposited in a square pattern or a circular pattern (from a top view), respectively, on at least a portion of the layer 30 of the polymeric particle composition 10. In the example shown in FIG. 5C, the liquid suspension 32 is disposed, for example, in a square pattern over the area 38 of the layer 30 and not on the areas 36.

Not to be bound by any particular theory, but the aqueous nature of the liquid suspension 32 may enable the liquid suspension 32 to infiltrate, at least partially, into the polymeric powder particle composition layer 30. In particular, the liquid suspension 32 infiltrates into the cavities between the polymeric particles. While the liquid suspension is described as aqueous in this example, non-aqueous suspensions may also be employed.

Figure 5D:
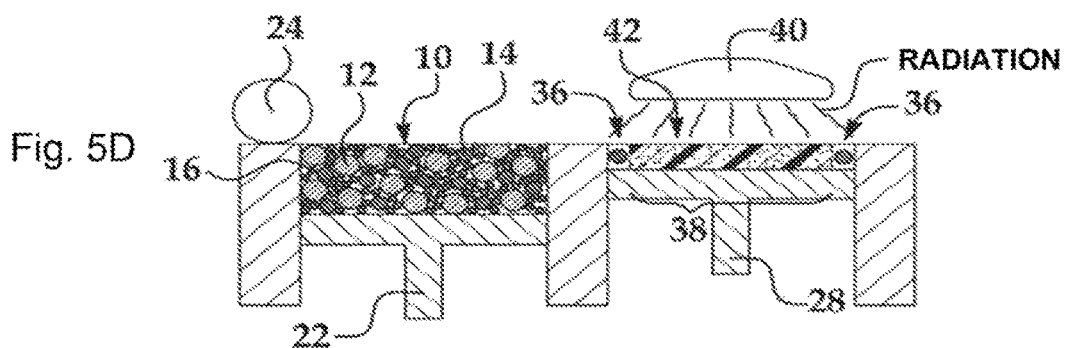

After the liquid suspension 32 is selectively applied in the desired area(s) 38, the entire layer 30 of the polymeric particle composition 10 and the liquid suspension 32 applied to at least a portion thereof are exposed to radiation. The application may involve at least one of a thermal inkjet printer and a piezoelectric inkjet printer. This is shown in FIG. 5D.

The energy source 40 may refer to any source that may emit an energy. The energy herein may comprise any suitable radiant energy, depending on the application. For example, the energy may comprise at least one of infrared-light, visible light, microwave, and laser heating. The radiation-energy is emitted from an energy source 40, such as an IR, near-IR, UV, or visible curing lamp, IR, near-IR, UV, or visible light emitting diodes (LED), or lasers with specific wavelengths. In one example, the energy source 40 is a halogen lamp, such as one with 1000 W. In another example, the energy source 40 is an emissive entity equivalent to a black body source operating at about 3000 K. The type of energy source 40 employed may depend, at least in part, on the type of liquid suspension 32, particularly the coalescent agent, that is used. The energy source 40 may be attached, for example, to a carriage that also holds the distributor(s) 34. The carriage may move the energy source 40 into a position that is adjacent to the fabrication bed 26. The energy source 40 may be programmed to receive commands from the central processing unit and to expose the layer 30 and liquid suspension 32 to radiation. The length of time the radiation is applied for, or energy exposure time, may be dependent, for example, on at least one of: characteristics of the energy source 40; characteristics of the polymeric power material 10; and characteristics of the liquid suspension 32.

The energy source 40 may apply light, as an example of radiant energy, to the polymeric particles to cause the solidification of portions of the polymeric particles according to where coalescent agent has been delivered or has penetrated. In some examples, the light source is an infra-red ("IR") or a near infra-red light source, or a halogen light source. The light source may be a single light source or an array of multiple light sources. In some examples, the light source is configured to apply light energy in a substantially uniform manner simultaneously to the whole surface of a layer of polymeric particles. In other examples, the light source is configured to apply energy to only certain area(s) of the whole surface of a layer of polymeric particles. In these examples, light source may be moved or scanned across the layer of polymeric particles, such that a substantially equal amount of energy is applied to the selected areas or across the whole surface of a layer of polymeric particles.

The length of time the radiation is applied for, or the energy exposure time, may be dependent on, for example, one or more of: characteristics of the radiation source and characteristics of the materials involved (e.g., polymeric particles and coalescent agent).

It is to be understood that variations in the fusing level may be achieved by altering (increasing or decreasing) the energy exposure time along the X, Y, and/or Z axes. As an example, when it is desirable that the level of fusing decrease along the Z axis, the radiation exposure time may be the highest the first layer and decrease in subsequently formed layers. In another example, variations in the level of fusing may be achieved by altering (increasing or decreasing) the amount of coalescent agent that is applied along the X, Y, and Z axes.

The coalescent agent may enhance the absorption of the radiation, convert the absorbed radiation to thermal energy, and/or promote the transfer of the thermal heat to the polymeric particle composition 10 in contact therewith (i.e., in the area 38). It is noted that at this stage the polymeric particles are at the working temperature (as a result of the pre-heating). Upon exposure to the energy source, the coalescent agent covert the energy into heat while thermally decomposing, thereby elevating the temperature of the polymeric particle composition 10 in the area 38 to be at or above the melting temperature(s) of the particles, allowing curing (e.g., melting, sintering, binding, fusing, etc.) of the particles 12, 14, 16 to take place. In this example, the coalescent agent thermally decomposes at the working temperature of the polymeric particles to cause elevation of the temperature of the polymeric temperature to begin curing. The coalescent agent may also cause, for example, heating of the polymeric particle composition 10 below its melting temperature but to a temperature suitable to cause softening and bonding of the particles 12, 14, 16. It is to be understood that area(s) 36 not having the coalescent agent applied thereto absorb little energy, and thus the polymeric particle composition 10 within these area(s) 36 generally does not exceed the melting temperature(s) of the particles 12, 14, 14, and does not cure. This causes one layer 42 of the 3D object 44 (see FIG. 5E) to be formed.

The steps shown and described in reference to FIGS. 5A through 5D may be repeated as many times as desirable to create subsequent layers 46, 48, 50 (FIG. 5E) and finally to form the 3D object 44. Because the coalescent agent becomes ineffective in energy-absorbing, heat absorbed during the application of energy from a portion of the polymeric particle composition 10 on which a coalescent agent has been delivered or has penetrated may not propagate to a previously solidified layer, such as layer 42.

Figure 5E:
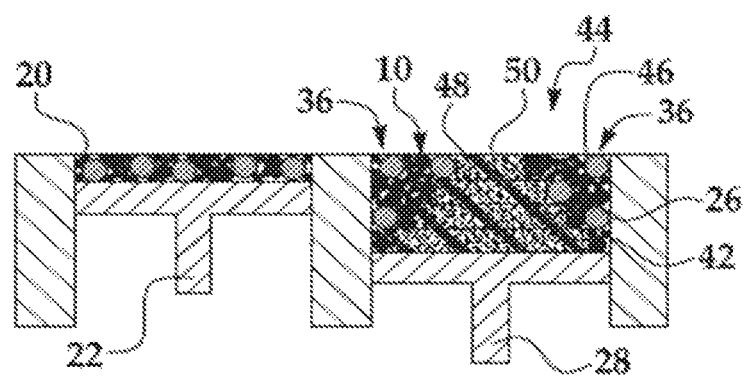

FIG. 5E illustrates one example of the 3D object 44. However, the subsequently formed layers 46, 48, 50 may have any desirable shape and/or thickness and may be the same as or different from any other layer 42, 46, 48, 50 depending upon the size, shape, etc. of the 3D object 44 that is to be formed.

As illustrated in FIG. 5E, as subsequent layers 46, 48, 50 are formed, the delivery piston 22 is pushed closer to the opening of the delivery bed 20, and the supply of the polymeric particle composition 10 in the delivery bed 20 is diminished (compared to, for example, FIG. 5A at the outset of the method). The fabrication piston 28 is pushed further away from the opening of the fabrication bed 26 in order to accommodate the subsequent layer(s) of polymeric particle composition 10 and selectively applied liquid suspension 32 containing the coalescent agent. Since at least some of the polymeric particle composition 10 remains uncured after each layer 42, 46, 48, 50 is formed in this example, the 3D object 44 is at least partially surrounded by the uncured polymeric particle composition 10 in the fabrication bed 26.

When the 3D object 44 is formed, it may be separated and removed from the fabrication bed, and the uncured polymeric particle composition 10 remaining in the fabrication bed 26 may be reused.

In one example, the combination of polymeric particles, coalescing and coalescence modifier agents, and light energy may be selected for an object slice so that (1) polymeric particles with no coalescent agent does not coalesce when the energy is applied, (2) polymeric particles with only coalescent agent solidifies when energy is applied; or (3) polymeric particles with both agents undergo a modified degree of coalescence between no coalescence and solidification with or without the application of energy.

In one example, more than one coalescent agent employed. The multiple coalescent agent may include any of the aforedescribed coalescent agents and other types of energy absorber, such as on that does not having a thermal decomposition temperature lower than or equal to the melting temperature of the thermoplastic. In particular, in one example, this additional coalescent agent does not thermally decompose and remain energy absorbing after being exposed to a radiant energy. A not thermally decomposing coalescent agent may be any of those aforedescribed, including carbon black. Not to be bound any particular theory, but the presence of this not-one-time-use absorber may improve adhesion between adjacent layers by prolonging thermal interaction between them even when they are buried below the surface. The use of a combination of a thermally decomposing and a non-thermally decomposing coalescent agents may depend upon which effect is desired to prevail, or what part of an object slice is being printed—e.g., overhanging slice, center of the slice in contact with slice below and above, etc. In one example, both types of the coalescent agents are disposed (in the same or different liquid suspensions) within a given area of a pulverulent layer, while the volume or weight ratio (or density of drops) of these two types of agents are controlled to provide the desirable effect. In one example, this provides a smooth transition from a region in which one effect dominates to another region in which the other effect dominates.

Figure 6:
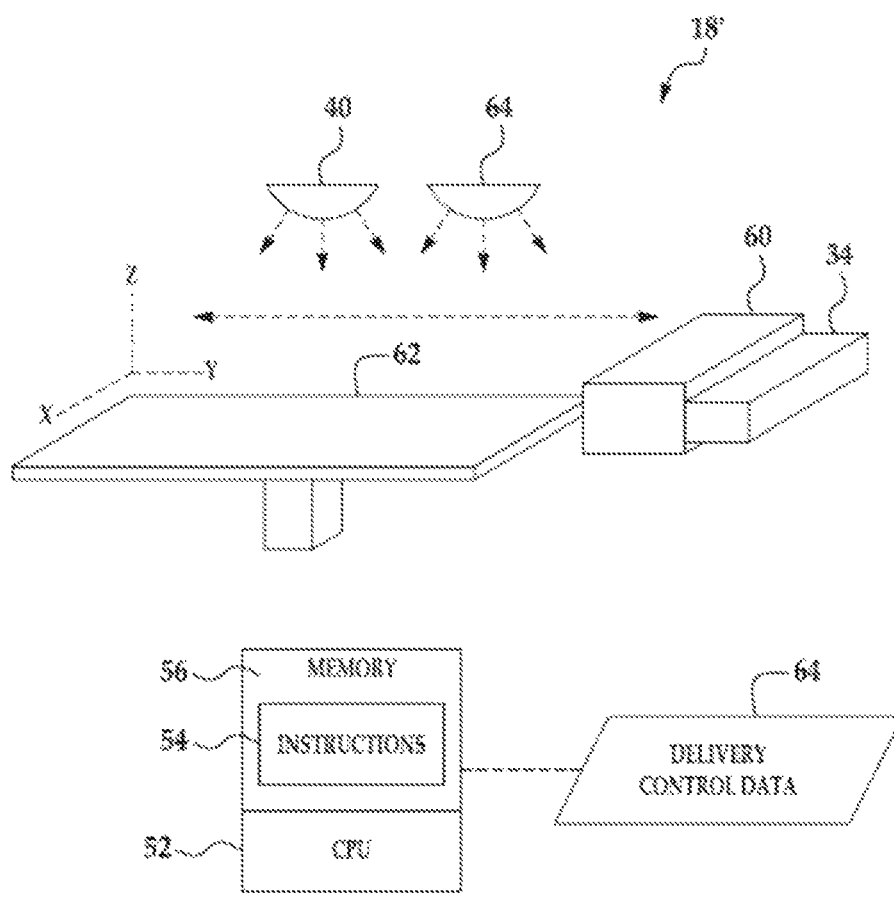
FIG. 6 is a simplified isometric view of an example of a 3D printing system that may be used in one example of the 3D printing method described herein.

Referring to FIG. 6, another example of the printing system 18' is depicted. The system 18' includes a central processing unit 52 that controls the general operation of the additive printing system 18'. As an example, the central processing unit 52 may comprise a controller, such as a microprocessor-based controller, that is coupled to a memory 56, for example using a communications bus (not shown). The memory 56 may store the machine (e.g., computer) readable instructions 54. The central processing unit 52 may execute the instructions 54, and thus may control operation of the system 18' in accordance with the instructions 54.

In this example, the printing system 18' includes a coalescent agent distributor 34 to selectively deliver a coalescent fluid comprising a coalescent agent (e.g., in a liquid suspension) to a layer (not shown in this figure) of polymeric particles provided on a support member 62. In one example, the support member 62 has dimensions ranging from about 10 cm by about 10 cm up to about 100 cm by about 100 cm, although the support member 62 may have larger or smaller dimensions depending upon the 3D object 44 that is to be formed.

The central processing unit 52 may control the selective delivery of the coalescent agent to the layer of the polymeric particles in accordance with delivery control data 64.

In the example shown in FIG. 6, the distributor 34 is a printhead, such as a thermal printhead or a piezoelectric inkjet printhead. The distributor 34 may be a drop-on-demand printhead or a continuous drop printhead.

The distributor 34 may be used to deliver selectively the coalescent fluid, including a coalescent agent, when in the form of a suitable fluid, such as in a liquid suspension. As such, in some example, the coalescent agent may include a liquid carrier, such as water and/or any other suitable solvent and/or dispersant, to enable it to be delivered via the distributor 34.

In one example, the distributor 34 is selected to deliver drops of the liquid suspension containing coalescent agent at a resolution ranging from about 300 dots per inch ("DPI") to about 1200 DPI. In another example, the distributor 34 is selected to be able to deliver drops of the liquid suspension at a higher or lower resolution.

The distributor 34 may include an array of nozzles through which the distributor 34 is able to selectively eject drops of fluid. In one example, each drop may be in the order of about 10 pico liters (pl) per drop, although it is contemplated that a higher or lower drop size may be used. In some examples, distributor 34 is able to deliver variable size drops.

The distributor 34 may be an integral part of the printing system 18', or they may be user replaceable. When the distributor 34 is user replaceable, it may be removably insertable into a suitable distributor receiver or interface module (not shown).

In another example of the printing system 18', a single inkjet printhead is employed to deliver selectively different types of the coalescent agents in one or multiple liquid suspensions. For example, a first set of printhead nozzles of the printhead may be configured to deliver one type of coalescent agent, and a second set of printhead nozzles of the printhead may be configured to deliver another type of coalescent agent.

As shown in FIG. 6, the distributor 34 has a length that enables it to span the whole width of the support member 62 in a page-wide array configuration. In one example, the page-wide array configuration is achieved through a suitable arrangement of multiple printheads. In another example, the page-wide array configuration is achieved through a single printhead with an array of nozzles having a length to enable it to span the width of the support member 62. In other examples of the printing system 18', the distributor 34 may have a shorter length that does not enable it to span the whole width of the support member 62.

While not shown in FIG. 6, the distributor 34 may be mounted on a moveable carriage to enable it to move bi-directionally across the length of the support member 62 along the illustrated y-axis. This may enable selective delivery of the liquid suspension across the whole width and length of the support member 62 in a single pass. In other examples, the distributor 34 may be fixed while the support member 62 is configured to move relative thereto.

As used herein, the term "width" may refer to the shortest dimension in the plane parallel to the x and y axes shown in FIG. 6, and the term "length" to the longest dimension in this plane. However, it is to be understood that in another example the term "width" may be interchangeable with the term "length." As an example, the distributor 34 may have a length that enables it to span the whole length of the support member 62 while the moveable carriage may move bi-directionally across the width of the support member 62.

In examples in which the distributor 34 has a shorter length that does not enable them to span the whole width of the support member 62, the distributor 34 may also be movable bi-directionally across the width of the support member 62 in the illustrated x-axis. This configuration may enable selective delivery of the liquid suspension across the whole width and length of the support member 62 using multiple passes.

The distributor 34 may include therein a supply of the liquid suspension, or may be operatively connected to a separate supply of the liquid suspension 32.

As shown in FIG. 6, the printing system 18' also includes a polymeric particle composition distributor 60. This distributor 60 is used to provide the layer (e.g., layer 30) of the polymeric particle composition 10 on the support member 62. Suitable polymeric particle composition distributors 60 may include, for example, a wiper blade and a roller.

The polymeric particle composition 10 may be supplied to the polymeric particle composition distributor 60 from a hopper or other suitable delivery system. In the example shown, the polymeric particle composition distributor 60 moves across the length (y-axis) of the support member 62 to deposit a layer of the polymeric particle composition 10. As previously described, a first layer of polymeric particle composition 10 will be deposited on the support member 62, whereas subsequent layers of the polymeric particle composition 10 will be deposited on a previously deposited (and solidified) layer.

The support member 62 may also be movable along the z-axis. In one example, the support member 62 is moved in the z-direction such that as new layers of polymeric particle composition 10 are deposited, a predetermined gap is maintained between the surface of the most recently formed layer and the lower surface of the distributor 34. In another example, however, the support member 62 is fixed along the z-axis, and the distributor 34 may be movable along the z-axis.

Similar to the system 18 as shown in FIGS. 5A-5E, the system 18' also includes the energy source 40 to apply energy to the deposited layer of polymeric powder material 10 and the liquid suspension 32 to cause the solidification of portion(s) 38 of the polymeric powder material 10. Any of the previously described energy sources may be used. In one example, the energy source 40 is a single energy source that is able to uniformly apply energy to the deposited materials, and in another example, energy source 40 includes an array of energy sources to uniformly apply energy to the deposited materials.

In the examples disclosed herein, the energy source 40 is configured apply energy in a substantially uniform manner to the entire surface of the deposited polymeric particle composition 10. This type of energy source 40 may be referred to as an unfocused energy source. Exposing the entire layer to energy simultaneously may help increase the speed at which a three-dimensional object may be generated.

While not shown, it is to be understood that the energy source 40 may be mounted on the moveable carriage or may be in a fixed position.

The central processing unit 52 may control the energy source 40. The amount of energy applied may be in accordance with delivery control data 64.

The system 18' may also include a pre-heater 64 that is used to pre-heat the deposited polymeric powder material 10

(as shown and described in reference to FIG. 5B). The use of the pre-heater 64 may help reduce the amount of energy that has to be applied by the energy source 40.

In one example of a LAP method, a pulverulent layer comprising polymeric particles is formed over a substrate. The layer may be formed over a substrate. A regular roller coater and/or a blade coater may be employed for the formation. The pulverulent layer may comprise any of the polymeric particles as described above and cavities between the particles. The polymeric particles may have any of the aforedescribed sizes. In one example, the particles comprise a thermoplastic. In one example, the particles comprise at least one of polyamide, polyethylene, polypropylene, and polyurethane. In one example, the particles comprises PA-12 and/or PA-11. In this example, the particles have an average size of between about 5 µm and about 250 µm—e.g., between about 10 µm and about 150 µm. In this example, polymeric particles having multiple sizes were employed.

In this example, the liquid suspension employed may comprise a coalescent agent, as any of those described above, and is selectively disposed over at least a portion of the pulverulent layer. The coalescent agent may be any of described herein in any combination with the polymeric particles described herein. For example, the coalescent agent may comprise at least one of a cyanine, a dithiolene, a triarylene, a phthalocyanine, a naphthalocyanine, and a tetraaryldiamino phenylene. In one example, the coalescent agent comprises a cyanine-based ink—i.e., FHI 963131 (in water) and FHI 9632, available from Fabricolor Holding International LLC, NJ, USA. In one example, the polymeric particles comprise a thermoplastic comprising nylon, and the coalescent agent comprises a cyanine. In another example, the polymeric particles comprise nylon, and the coalescent agent comprises a dithiolene. In another example, the polymeric particles comprise nylon, and the coalescent agent comprises a triarylene. In another example, the polymeric particles comprise nylon, and the coalescent agent comprises a phthalocyanine. In another example, the polymeric particles comprise nylon, and the coalescent agent comprises a naphthalocyanine. In another example the polymeric particles comprise nylon, and the coalescent agent comprises a tetraaryldiamino phenylene. In one example, the nylon described herein is PA-11. In another example, the nylon described herein is PA-12.

The coalescent agent may be present at between about 1 wt % and about 4 wt % with respect to the powders. The disposition may involve inkjet printing. The inkjet printing may involve at least one of a thermal printer and a piezoelectric printer, as described above. The liquid suspension may infiltrate into the cavities of the layer. The coalescent agent may infiltrate the layer and be in close proximity to both the polymeric particles Printed 3D Object Due at least in part to the characteristics of the materials employed in the printing described herein, the final 3D object, or the object slice(s) thereof, may exhibit certain characteristics. For example, not all of the coalescent agent need to decompose thermally at once. In one example, some of the coalescent agent penetrates the pulverulent layer and infiltrates the cavities therein, while the remaining begin to undergo thermal decomposition. As a result, in this example, as time goes on a gradient of coalescent agent is created in a depth-wise direction in the pulverulent layer. In this example, a portion of the coalescent agent decomposes thermally at the upper portion of the pulverulent layer, while some of coalescent agent in the deeper portion remains undecomposed, or less decomposed. In another example, the thermally decomposing nature of the coalescent agent provides a mechanism to self-limit heating of the powder in the pulverulent layer, thereby preventing thermal degradation of structural material due to overheating. Additionally, if the coalescent agent is distributed over the layer thickness, such self-limiting absorption also helps distribute energy more effectively over layer thickness, thereby potentially improving interlayer fusing. Moreover, in one example, as the upper portion of the pulverulent layer heats up above a melting temperature of the polymeric particles, the highest absorption occurs deeper in the layer and that part of a layer is heated by direct absorption ether than temperature gradient driven heat conduction.

The thermal decomposition may transform the coalescent agent, and the transformation may affect the properties of the final object slice or final 3D object. The properties may refer to mechanical properties. In one example, after the coalescent agent has decomposed and/or transformed, the amount of the coalescent agent in the pulverulent layer is small and generally will have lost the radiation-absorption characteristics. Thus, the remaining coalescent agent would not, at least not significantly, affect the fusing of the next layer, or the mechanical properties of the final 3D object. It is noted that by using the aforedescribed materials, particularly the coalescent agent, the methods and systems described herein may decrease, or even minimize, the need to compensate for the extra temperature rise due to unwanted absorption by tailoring the amount of absorber printed at the edge of are to be fused. This compensation is commonly employed and may be computationally intensive and increase the complexity of pre-production processing and limit workflow. Particularly, this kind of compensation may be affected by materials in small length scale and environment variations.

Due at least in part to the materials and processes described herein, the final resultant printed 3D object may have several properties (e.g., those aforedescribed) that make the 3D object suitable for a variety of applications. One example of the applications of the 3D object described herein is an operating mechanical part; the 3D object described herein is suitable because it may have the suitable mechanical properties and dimensional fidelity, including desirable stiffness, flexing capability, wear resistance, etc. Another example is a prototype mechanical part. Another example is a recreational component (e.g., toys, art objects, jewelry, etc.; the 3D object described herein is suitable because it has desirable surface finish, pleasing appearance, color, and/or dimensional flexibility.

Additional Notes

All literature and similar material cited in this application, including, but not limited to, patents, patent applications, articles, books, treatises, and web pages, regardless of the format of such literature and similar materials, are expressly incorporated by reference in their entirety. In the event that any of the incorporated literature and similar materials differs from or contradicts this application, including but not limited to defined terms, term usage, described techniques, or the like, this application controls.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

All definitions, as defined and used herein, should be understood to control over dictionary definitions, definitions in documents incorporated by reference, and/or ordinary meanings of the defined terms.

The indefinite articles "a" and "an," as used herein in this disclosure, including the claims, unless clearly indicated to the contrary, should be understood to mean 'at least one.' Any ranges cited herein are inclusive.

The terms "substantially" and "about" used throughout this disclosure are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3 from 2-4, and from 3-5, etc. This same principle applies to ranges reciting only one numerical value. Furthermore, such an interpretation should apply regardless of the breadth of the range or the characteristics being described.

The phrase "and/or," as used herein in this disclosure, including the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one example, to A only (optionally including elements other than B); in another example, to B only (optionally including elements other than A); in yet another example, to both A and B (optionally including other elements); etc.

As used in this disclosure, including the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the claims, shall have its ordinary meaning as used in the field of patent law.

As used in this disclosure, including the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

The claims should not be read as limited to the described order or elements unless stated to that effect. It should be understood that various changes in form and detail may be made by one of ordinary skill in the art without departing from the spirit and scope of the appended claims. All examples that come within the spirit and scope of the following claims and equivalents thereto are claimed.

What is claimed:

1. A three-dimensional ("3D") printing method, comprising:
 (A) forming a layer comprising particles comprising a thermoplastic;
 (B) disposing over at least a portion of the layer an aqueous liquid suspension including a coalescent agent, which is radiation-absorbing and has a thermal decomposition temperature lower than or equal to a melting temperature of the thermoplastic;
 (C) forming an object slice of a 3D object by exposing the coalescent agent to a radiant energy such that at least some of the coalescent agent thermally decomposes while causing at least some of the particles to fuse, wherein the object slice comprises the fused particles, and wherein the thermally decomposed coalescent agent is not radiation-absorbing; and
 (D) repeating (A) to (C) to form the 3D object comprising multiple object slices bound depth-wise to one another.

2. The 3D printing method of claim 1, wherein the thermoplastic comprises at least one of polyamide, polyethylene, polypropylene, and polyurethane.

3. The 3D printing method of claim 1, wherein the coalescent agent comprises at least one of a cyanine, a dithiolene, a triarylene, a phthalocyanine, a naphthalocyanine, and a tetraaryldiamino phenylene.

4. The 3D printing method of claim 1, wherein the thermal decomposition temperature is between about 10° C. and about 25° C. lower than or equal to the melting temperature of the thermoplastic.

5. The 3D printing method of claim 1, wherein the coalescent agent has a maximum absorption wavelength in the range between about 700 nm and about 1400 nm.

6. The 3D printing method of claim 1, wherein the thermoplastic comprises nylon and the coalescent agent comprises a cyanine.

7. The 3D printing method of claim 1, further comprising heating the particles to a temperature between about 10° C. and about 25° C. below the melting temperature of the thermoplastic before (B).

8. The 3D printing method of claim 1, further comprising disposing over at least a portion of the layer an additional aqueous liquid suspension including an additional coalescent agent, the additional coalescent agent being radiation-absorbing and not having a thermal decomposition temperature lower than or equal to the melting temperature of the thermoplastic.

9. The 3D printing method of claim 1, wherein the object slice exhibits one of the following:
   being at least substantially free of the coalescent agent and the thermally decomposed coalescent agent; and
   (ii) being at least substantially free of the coalescent agent and comprising the thermally decomposed coalescent agent, which is not radiation-absorbing and not volatile.

10. The 3D print method of claim 1, wherein during the thermal decomposition, the exposing causes the at least some of the particles to melt before fusing and the coalescent agent to infiltrate the layer to create in the layer a depth-wise concentration gradient of the coalescent agent.

11. The 3D printing method of claim 1, wherein the thermoplastic particles have a core-shell configuration wherein an internal polymer particle has a polymeric coating disposed thereon.

12. A three-dimensional ("3D") printing method, comprising:
   (A) forming a first layer comprising first particles comprising a first thermoplastic;
   (B) disposing over at least a portion of the first layer an aqueous liquid suspension including a first coalescent agent, which is radiation-absorbing and has a first thermal decomposition temperature between about 10° C. and about 25° C. lower than or equal to a melting temperature of the first thermoplastic;
   (C) exposing the first coalescent agent to a radiant energy, such that at least some of the first coalescent agent thermally decomposes while causing at least some of the first particles to melt, to sinter, or both, and the first coalescent agent to infiltrate the first layer;
   (D) solidifying the melted first particles to form a first object slice of a three-dimensional object, wherein the first object slice comprises the fused first particles, and wherein the thermally decomposed first coalescent agent is not radiation-absorbing;
   (E) disposing over at least a portion of the first object slice a second layer comprising second particles comprising a second thermoplastic;
   (F) disposing over at least a portion of the layer a second aqueous liquid suspension including a second coalescent agent, which is radiation-absorbing and has a second thermal decomposition temperature between about 10° C. and about 25° C. lower than or equal to a melting temperature of the second thermoplastic;
   (G) exposing the second coalescent agent to a radiant energy, such that at least some of the second coalescent agent thermally decomposes while causing at least some of the second particles to melt, to sinter, or both, and the second coalescent agent to infiltrate the second layer, wherein the non-melted or non-sintered first particles in the first layer are not melted or sintered during the exposure; and
   (H) solidifying the melted second particles to form a second object slice of the three-dimensional object, wherein the second object slice comprises the second fused particles, and wherein the second thermally decomposed coalescent agent is not radiation-absorbing.

13. The 3D printing method of claim 12, where a portion of the second object slice overhangs the first object slice.

14. The 3D printing method of claim 12, wherein the three-dimensional object exhibits at least one of the following:
   (i) the first thermoplastic and the second thermoplastic comprise the same materials; and
   (ii) the first coalescent agent and the second coalescent agent comprise the same materials.

* * * * *